United States Patent
Distefano et al.

(10) Patent No.: US 12,478,948 B2
(45) Date of Patent: Nov. 25, 2025

(54) PERFLUOROALKYL AND POLYFLUOROALKYL SORBENT MATERIALS AND METHODS OF USE

(71) Applicant: CALGON CARBON CORPORATION, Moon Township, PA (US)

(72) Inventors: Rebecca L. Distefano, Oakdale, PA (US); Richard A. Mimna, Oakdale, PA (US)

(73) Assignee: CALGON CARBON CORPORATION, Moon Township, PA (US)

(*) Notice: Subject to any disclaimer, the term of this patent is extended or adjusted under 35 U.S.C. 154(b) by 0 days.

(21) Appl. No.: 18/442,503

(22) Filed: Feb. 15, 2024

(65) Prior Publication Data

US 2024/0246059 A1  Jul. 25, 2024

Related U.S. Application Data

(63) Continuation of application No. 16/839,862, filed on Apr. 3, 2020, now Pat. No. 11,911,743.

(60) Provisional application No. 62/828,790, filed on Apr. 3, 2019.

(51) Int. Cl.

| | | |
|---|---|---|
| B01J 20/20 | (2006.01) | |
| B01D 53/02 | (2006.01) | |
| B01J 20/04 | (2006.01) | |
| B01J 20/30 | (2006.01) | |
| C02F 1/28 | (2023.01) | |
| C02F 101/36 | (2006.01) | |

(52) U.S. Cl.
CPC .......... *B01J 20/20* (2013.01); *B01D 53/02* (2013.01); *B01J 20/041* (2013.01); *B01J 20/3028* (2013.01); *C02F 1/283* (2013.01); *C02F 2101/36* (2013.01)

(58) Field of Classification Search
CPC ...... B01J 20/20; B01J 20/041; B01J 20/3028; B01D 53/02; C02F 1/283
See application file for complete search history.

(56) References Cited

U.S. PATENT DOCUMENTS

| | | |
|---|---|---|
| 2,038,071 A | 4/1936 | Wilhelm |
| 3,713,281 A | 1/1973 | Asker et al. |
| 3,757,488 A | 9/1973 | Austin et al. |
| 4,331,639 A | 5/1982 | Hass et al. |
| 4,624,937 A | 11/1986 | Chou |
| 4,921,826 A | 5/1990 | Juntgen et al. |
| 5,016,628 A | 5/1991 | Lambert |
| 5,248,395 A | 9/1993 | Rastelli et al. |
| 5,322,778 A | 6/1994 | Antrim et al. |
| 5,338,458 A | 8/1994 | Carrubba et al. |
| 5,348,755 A | 9/1994 | Roy |
| 5,352,274 A | 10/1994 | Blakley |
| 5,356,849 A | 10/1994 | Matviya et al. |
| 5,500,038 A | 3/1996 | Dauber et al. |
| 5,504,050 A | 4/1996 | Hayden |
| 5,598,721 A | 2/1997 | Rockenfeller et al. |
| 5,754,002 A | 5/1998 | Haitko et al. |
| 5,821,682 A | 10/1998 | Foust et al. |
| 5,861,050 A | 1/1999 | Pittel et al. |
| 6,176,897 B1 | 1/2001 | Keefer |
| 6,186,939 B1 | 2/2001 | Forrester |
| 6,342,129 B1 | 1/2002 | Vaughn et al. |
| 6,406,523 B1 | 6/2002 | Connor et al. |
| 6,599,856 B1 | 7/2003 | Uchino et al. |
| 6,699,393 B2 | 3/2004 | Baker et al. |
| 6,706,194 B2 | 3/2004 | Baker et al. |
| 6,848,374 B2 | 2/2005 | Srinivasachar et al. |
| RE38,844 E | 10/2005 | Hiltzik et al. |
| 7,077,891 B2 | 7/2006 | Jaffe et al. |
| 7,222,612 B2 | 5/2007 | Hagler et al. |
| 7,278,406 B2 | 10/2007 | Hagler |
| 7,361,280 B2 | 4/2008 | Baker |
| 7,547,350 B2 | 6/2009 | Callahan et al. |
| 7,666,507 B2 | 2/2010 | Ishikawa et al. |
| 7,704,305 B2 | 4/2010 | Nishida |
| 7,780,765 B2 | 8/2010 | Srinivasachar et al. |
| 7,858,061 B2 | 12/2010 | Varma et al. |
| 7,862,725 B2 | 1/2011 | Mazyck et al. |
| 7,879,136 B2 | 2/2011 | Mazyck |

(Continued)

FOREIGN PATENT DOCUMENTS

| | | |
|---|---|---|
| CA | 2485103 A1 | 11/2003 |
| CN | 103073385 A | 5/2013 |

(Continued)

OTHER PUBLICATIONS

Wang et al., Chemosphere, (2015), v.131, p. 178-183.*
Miguel et al., Wat. Res. (2001), 35(11), p. 2740-2748.*
Appleman et al. "Treatment Of Poly-and Perfluoroalkyl Substances In U.S. Full-scale Water Treatment Systems" 2014, Water Research 51: 246-255.
Barrios-Bermudez et al. "Fe—Cu Doped Multiwalled Carbon Nanotubes for Fenton-like Degradation of Paracetamol under Mild Conditions" Apr. 14, 2020, Nanomaterials 10(749):1-18.
CHEMED "The Chemistry of Nitrogen and Phosphorous" Mar. 19, 2006, Purdue Chemistry, retrieved from the internet: chemed.chem.purdue.edu/genchem/topicreview/bp/ch10/group5.php#negative 1-16 Pages, XP055724459.

(Continued)

*Primary Examiner* — Yong L Chu
(74) *Attorney, Agent, or Firm* — DLA Piper LLP (US)

(57) ABSTRACT

Sorbent materials that are treated with ions, salts, oxides, hydroxides, or carbonates of calcium, magnesium, strontium, or barium are useful in removing perfluoroalkyl and polyfluoroalkyl substances (PFAS), perfluorooctanoic acid (PFOA), perfluorooctanesulfonic acid (PFOS), 2,3,3,3,-tetrafluoro-2-(heptafluoropropoxy)propanoate and heptafluoropropyl 1,2,2,2-tetrafluoroethyl ether, and similar compounds from liquids and gases are disclosed. The sorbent materials with the disclosed treatments offer improved performance as measured against untreated sorbent materials.

5 Claims, 7 Drawing Sheets

(56) References Cited

U.S. PATENT DOCUMENTS

| | | | |
|---|---|---|---|
| 7,923,410 | B2 | 4/2011 | Turk et al. |
| 8,034,163 | B1 | 10/2011 | Durham et al. |
| 8,042,524 | B2 | 10/2011 | Elum et al. |
| 8,057,576 | B1 | 11/2011 | Pollack |
| 8,069,797 | B2 | 12/2011 | Srinivasachar et al. |
| 8,080,088 | B1 | 12/2011 | Srinivasachar |
| 8,168,147 | B2 | 5/2012 | Olson et al. |
| 8,263,524 | B1 | 9/2012 | Skandan et al. |
| 8,864,877 | B2 | 10/2014 | Nishita et al. |
| 9,120,079 | B1 | 9/2015 | Dietz et al. |
| 9,174,205 | B2 | 11/2015 | Reimerink-Schats et al. |
| 9,199,862 | B2 | 12/2015 | Kuramitsu et al. |
| 9,732,649 | B2 | 8/2017 | Hiltzik et al. |
| 10,155,673 | B2 | 12/2018 | Stouffer et al. |
| 11,872,539 | B2 | 1/2024 | Mazzoccoli et al. |
| 11,911,743 | B2 * | 2/2024 | Distefano ............... B01J 20/06 |
| 2002/0170436 | A1 | 11/2002 | Keefer et al. |
| 2003/0188663 | A1 | 10/2003 | Barthel et al. |
| 2004/0118287 | A1 | 6/2004 | Jaffe et al. |
| 2004/0118387 | A1 | 6/2004 | Lawrence |
| 2005/0081717 | A1 | 4/2005 | Meiller et al. |
| 2005/0150835 | A1 | 7/2005 | Vo |
| 2005/0167367 | A1 | 8/2005 | Baker |
| 2006/0042467 | A1 | 3/2006 | Maru |
| 2006/0054142 | A1 | 3/2006 | Burke et al. |
| 2007/0169758 | A1 | 7/2007 | Mills |
| 2007/0272080 | A1 | 11/2007 | Allen et al. |
| 2008/0073290 | A1 | 3/2008 | Ryan et al. |
| 2008/0121142 | A1 | 5/2008 | Comrie et al. |
| 2008/0283446 | A1 | 11/2008 | Tatarchuk et al. |
| 2008/0308075 | A1 | 12/2008 | Allen et al. |
| 2009/0172998 | A1 | 7/2009 | Harris et al. |
| 2009/0223370 | A1 | 9/2009 | Kosugi et al. |
| 2010/0178624 | A1 | 7/2010 | Srinivasachar |
| 2011/0030592 | A1 | 2/2011 | Baldrey et al. |
| 2011/0076210 | A1 | 3/2011 | Pollack et al. |
| 2012/0048110 | A1 | 3/2012 | Dawes et al. |
| 2012/0100054 | A1 | 4/2012 | Durham et al. |
| 2012/0172216 | A1 | 7/2012 | Bohringer et al. |
| 2012/0220451 | A1 | 8/2012 | Miyata et al. |
| 2013/0078169 | A1 | 3/2013 | LaFLESH et al. |
| 2013/0109562 | A1 | 5/2013 | Wong et al. |
| 2013/0168321 | A1 | 7/2013 | Cannon et al. |
| 2013/0269532 | A1 | 10/2013 | Kimoto |
| 2013/0316433 | A1 | 11/2013 | Huang |
| 2014/0112856 | A1 | 4/2014 | Krutka et al. |
| 2014/0117054 | A1 | 5/2014 | Ryan et al. |
| 2014/0165542 | A1 | 6/2014 | Loftin et al. |
| 2014/0336568 | A1 | 11/2014 | Wong |
| 2015/0050202 | A1 | 2/2015 | Filippelli et al. |
| 2016/0023920 | A1 | 1/2016 | Doyle et al. |
| 2016/0102019 | A1 | 4/2016 | Pollack et al. |
| 2016/0166972 | A1 | 6/2016 | Owens et al. |
| 2016/0167982 | A1 | 6/2016 | Stouffer et al. |
| 2016/0236169 | A1 | 8/2016 | Doughty et al. |
| 2016/0271555 | A1 | 9/2016 | Hiltzik et al. |
| 2016/0346723 | A1 | 12/2016 | Honore et al. |
| 2017/0297926 | A1 | 10/2017 | Nickelsen et al. |
| 2018/0030871 | A1 | 2/2018 | Hiltzik et al. |
| 2018/0214816 | A1 | 8/2018 | Greenbank |
| 2019/0201870 | A1 | 7/2019 | Kumar Pal et al. |
| 2019/0247831 | A1 | 8/2019 | Tramposch et al. |
| 2019/0270081 | A1 | 9/2019 | Ilinich et al. |
| 2020/0038798 | A1 | 2/2020 | Greenbank et al. |
| 2020/0039809 | A1 | 2/2020 | Greenbank et al. |
| 2020/0040851 | A1 | 2/2020 | Greenbank et al. |
| 2020/0179902 | A1 | 6/2020 | Huang |

FOREIGN PATENT DOCUMENTS

| | | |
|---|---|---|
| CN | 108940191 A | 12/2018 |
| DE | 3620425 C1 | 6/1987 |
| EP | 0433677 A1 | 6/1991 |
| EP | 1413348 A1 | 4/2004 |
| EP | 1521723 A1 | 4/2005 |
| FR | 3077069 A1 | 7/2019 |
| GB | 1336241 A | 11/1973 |
| JP | S6458331 A | 3/1989 |
| JP | H08257359 A | 10/1996 |
| JP | 2008023365 A | 2/2008 |
| JP | 5556177 B2 | 7/2014 |
| KR | 20120074080 A | 7/2012 |
| WO | 8100399 A1 | 2/1981 |
| WO | 2009031562 A1 | 3/2009 |
| WO | 2010042321 A1 | 4/2010 |
| WO | 2011038415 A2 | 3/2011 |
| WO | 2011127323 A2 | 10/2011 |
| WO | 2013063490 A1 | 5/2013 |
| WO | 2013096251 A1 | 6/2013 |
| WO | 2013149241 A1 | 10/2013 |
| WO | 2014082076 A1 | 5/2014 |
| WO | 2014088630 A1 | 6/2014 |
| WO | 2014205200 A1 | 12/2014 |
| WO | 2016185033 A1 | 11/2016 |
| WO | 2017180346 A1 | 10/2017 |
| WO | 2018116842 A1 | 6/2018 |
| WO | 2018144588 A1 | 8/2018 |
| WO | 2018175936 A1 | 9/2018 |

OTHER PUBLICATIONS

Johnson et al. "Advanced Filtration Membranes For The Removal Of Perfluoroalkyl Species From Water" May 2, 2019, ACS Omega 4(5):8001-8006.

Mcnamara et al. "Comparison Of Activated Carbons For Removal Of Perfluorinated Compounds From Drinking Water" Jan. 31, 2018, Article In J. American Water Works Association, retrieved from the internet: https://cswab.org/wp-content/uploads/2018/12/Activated-Carbons-Comparison-for-Removal-of-PFAS-in-Drinking-Water-McNamara-2018.pdf 13 Pages, XP055899446.

Pietrzak et al. "Preparation of Nitrogen-Enriched Activated Carbons from Brown Coal" 2006, Energy Fuels 20(3):1275-280.

Raposo et al. "Mercury Speciation in Fluorescence Lamps by Thermal Release Analysis" 2003, Waste Management 23(10):879-886.

Sharifi et al. "Formation of Active Sites for Oxygen Reduction Reactions by Transformation of Nitrogen Functionalities in Nitrogen-Doped Carbon Nanotubes" Sep. 28, 2012, ACS Nano 6(10):2 Pages, DOI: 10.1021/nn302906r.

Sontheimer et al. "Evaluation Methods Utilizing Aqueous Solutions, In Activated Carbon For Water Treatment" 1988, DVGW-Forschungsstelle Second Edition 100-105.

Wang et al. "Influence Of Cations On The Partition Behavior Of Perfluoroheptanoate (PFHpA) and Berfluorohexanesulfonate (PFHxS) On Waste Water Sludge" Jul. 2015, Chemosphere 131:178-183.

Westreich et al. "The Removal Of Short-chain And Long-chain Perfluoroalkyl Acids And Sulfonates Via Granular Activated Carbons: A Comparative Column Study" Dec. 4, 2018, Remediation J. 29(1):19-26.

Xu et al. "Biomass Based Iron and Nitrogen Co-Doped 3D Porous Carbon as an Efficient Oxygen Reduction Catalyst" Mar. 28, 2018, Journal of Colloid and Interface Science 523:144-150.

Zhang, et al., "Nanostructured iron(III)-copper(II) binary oxide: A novel adsorbent for enhanced arsenic removal from aqueous solutions", Water Research, Mar. 22, 2013, vol. 47, pp. 4022-4031.

* cited by examiner

PERFLUOROALKYL AND POLYFLUOROALKYL SORBENT MATERIALS AND METHODS OF USE

RELATED APPLICATIONS

This application is a continuation of U.S. patent application Ser. No. 16/839,862 filed Apr. 3, 2020, now U.S. Pat. No. 11,911,743, which claims priority to U.S. Provisional Application Ser. No. 62/828,790 filed on Apr. 3, 2019, the content of which is hereby incorporated by reference in its entirety.

BACKGROUND

Perfluoroalkyl and polyfluoroalkyl substances (PFAS) are a group of compounds that include perfluorooctanoic acid (PFOA), perfluorooctanesulfonic acid (PFOS), and compounds produced by the GENX process such as 2,3,3,3,-tetrafluoro-2-(heptafluoropropoxy)propanoate and heptafluoropropyl 1,2,2,2-tetrafluoroethyl ether. Such highly fluorinated compounds enjoyed widespread industrial use for many years, owing to their chemical durability, excellent surfactant properties, and key role as precursors to fluoropolymers including polytetrafluoroethylene.

Unfortunately, these same properties render PFAS resistant to degradation in the environment, while simultaneously leading to bioaccumulation when ingested over time. Some recent studies have linked PFAS to various detrimental health effects, most notably elevated levels of cholesterol, but also kidney cancer, testicular cancer, thyroid disease, and pregnancy-induced hypertension.

To date, several technologies have been employed to remove PFAS compounds from the environment and from drinking water. Such technologies include granular activated carbon (GAC), ion exchange resins, and reverse osmosis. GAC has emerged as a leading solution, but there is continued need for performance improvements so that the GAC is even more effective at removing PFAS compounds from the environment and from drinking water.

SUMMARY

The disclosure describes sorbent materials that have improved performance in removing PFAS, including but not limited to PFOA, PFOS, and similar compounds from liquids and gases. The disclosed embodiments include:

In one embodiment, there is a method of removing perfluoroalkyl and polyfluoroalkyl substances (PFAS) from liquid or gas, the method comprising providing a first sorbent material including about 0.5 wt. % to about 25 wt. % of an ion, salt, oxide, hydroxide, or carbonate of magnesium, calcium, strontium, barium or combination or compound thereof to thereby increase the sorbent capacity of the sorbent material to perfluoroalkyl and polyfluoroalkyl substances (PFAS) relative to sorbent material that does not include the ion, salt, oxide, hydroxide, or carbonate; and contacting the first sorbent material with a liquid or gas containing the PFAS.

In another embodiment, the first sorbent material includes one or more of carbonaceous char, activated carbon, reactivated carbon, and carbon black.

In another embodiment, the carbonaceous char, activated carbon, reactivated carbon, or carbon black are formed from at least one of bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, or polymer fibers.

In another embodiment, wherein the first sorbent material is reactivated carbon.

In another embodiment, the first sorbent material is a reagglomerated activated carbon.

In another embodiment, there is a further step of providing a second sorbent material that includes one or more of carbonaceous char, activated carbon, reactivated carbon, carbon black, natural zeolite, synthetic zeolite, silica, silica gel, alumina, alumina clay, zirconia, diatomaceous earths, and metal oxides, and contacting the second sorbent material with the liquid or gas containing the PFAS.

In another embodiment, the first sorbent material includes one or more of an oxide of magnesium, an oxide of calcium, an oxide of strontium, or an oxide of barium.

In another embodiment, the first sorbent material includes one or more of MgO or CaO.

In another embodiment, the ion, salt, oxide, hydroxide, or carbonate of the first sorbent material is included in the first sorbent material by one or more of dry mixing, wet impregnation, chemical vapor deposition, or physical vapor deposition.

In another embodiment, the first sorbent material includes about 1 wt. % to about 20 wt. % of an ion, salt, oxide, hydroxide, or carbonate of magnesium, calcium, strontium, barium, or combinations or compounds thereof.

In another embodiment, the first sorbent material includes about 2 wt. % to about 8 wt. % of an ion, salt, oxide, or carbonate of magnesium, calcium, strontium, barium, or combinations or compounds thereof.

In another embodiment, the first sorbent material is a reactivated carbon comprising ions, oxides or carbonates of calcium, magnesium, sodium, potassium, and zinc, and the reactivated carbon has not undergone any process to remove or reduce the amount of the ions, oxides, or carbonates of calcium, magnesium, sodium, potassium and zinc.

In another embodiment, the reactivated carbon has not undergone any acid washing to remove or reduce the amount of the ions, oxides, or carbonates of calcium, magnesium, sodium, and zinc.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

Figure 1:
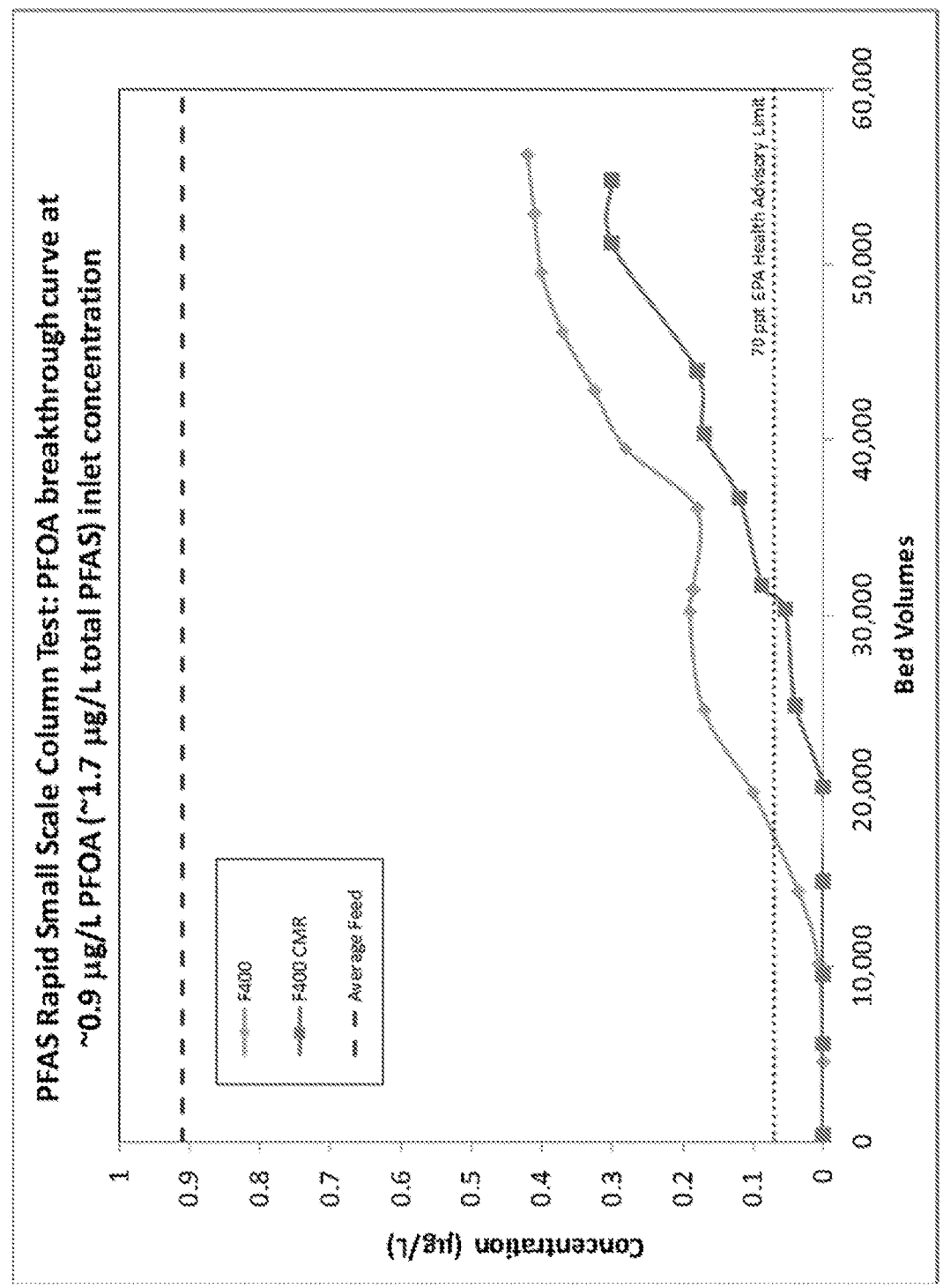
FIG. 1 is a graphical representation of the results of rapid small scale column testing activated carbon and reactivated carbon having elevated calcium content.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. Therefore, about 50% means in the range of 45%-55%.

As used herein, the term "sorbent material" is meant to encompass all known materials from any source that are capable of absorbing or adsorbing liquids and/or gases. For example, sorbent materials include, but are not limited to, activated carbon, reactivated carbon, natural and synthetic zeolite, silica, silica gel, alumina, zirconia, and diatomaceous earths.

As used herein, the term "perfluoroalkyl and polyfluoroalkyl substances (PFAS)" means any perfluoroalkyl or polyfluoroalkyl substance, mixture of such substances, or derivative of one or more such substances. Examples of PFAS include perfluoroalkyl sulfonate, perfluoroalkane sulfonic acid (PFSA), N-Butyl perfluoroalkane sulfonamide (BuFASA), N-Butyl perfluoroalkane sulfonamido ethanols (BuFASE), N-Butyl perfluoroalkane sulfonamido acetic acid (BuFASAA), N-Ethyl perfluoroalkane sulfonamide (EtFASA), N-Ethyl perfluoroalkane sulfonamido ethanol (EtFASE), N-Ethyl perfluoroalkane sulfonamido acetic acid (EtFASAA), perfluoroalkane sulfonamide (FASA), Perfluoroalkane sulfonamido ethanol (FASE), Perfluoroalkane sulfonamido acetic acid (FASAA), N-Methyl perfluoroalkane sulfonamide (MeFASA), N-Methyl perfluoroalkane sulfonamido acetic acid (MeFASAA), N-Methyl perfluoroalkane sulfonamido ethanol (MeFASE), N-Methyl perfluorooctane sulfonamide (MeFOSA), perfluoroalkane sulfonyl fluoride (PASF), 4,8-dioxa-3H-perfluorononanoate, ammonium perfluorooctanoate (APFO), fluoroprotein (FP), fluorotelomer carboxylic acid (FTCA), fluorotelomer alcohol (FTOH), fluorotelomer sulfonate (FTS), fluorotelomer sulfonic acid (FTSA), perfluoroalkyl acid (PFAA), perfluoroalkylsulfonamidoethanol (PFOSE), and any derivatives thereof. These include, for example and without limitation, perfluorooctanoic acid (PFOA), perfluorooctane sulfonate, perfluorooctanesulfonic acid (PFOS), 2,3,3,3,-tetrafluoro-2-(heptafluoropropoxy)propanoate, ammonium 2,3,3,3-tetrafluoro-2-(heptafluoropropoxy)propanoate, 1,2,2,2-tetrafluoroethyl ether, 4:2-Fluorotelomersulfonic acid (4:2 FtS), 6:2-Fluorotelomersulfonic acid (6:2 FtS), 8:2-fluorotelomersulfonic acid (8:2 FtS), perfluorobutanoic acid (PFBA), perfluorobutane sulfonate, perfluorobutane sulfonic acid (PFBS), perfluorohexane sulfonate, perfluorohexane sulfonic acid (PFHxS), perfluorohexanoate, perfluorohexanoic acid (PFHxA), 4,8-dioxa-3H-perfluorononanoate, ammonium perfluorooctanoate (APFO), N-Ethyl perfluorooctane sulfonamide (EtFOSA), N-Ethyl perfluorooctane sulfonamido ethanol (EtFOSE), perfluorooctane sulfonamide (PFOSA), perfluorooctane sulfonamido acetic acid (FOSAA), perfluorooctane sulfonamido ethanol (FOSE), perfluorobutanoate, perfluorobutanoic acid, perfluorobutyrate, perfluorobutyric acid, perfluoroalkyl carboxylate, perfluoroalkyl carboxylic acid (PFCA), perfluorodecanoate, perfluorodecanoic acid (PFDA), perfluorododecanoate, perfluorododecanoic acid (PFDoA), perfluorododecane sulfonate (PFDoS), perfluorododecane sulfonic acid (PFDoSA), perfluorodecane sulfonate, perfluorodecane sulfonic acid (PFDS), perfluoroheptanoate, perfluoroheptanoic acid (PFHpA), perfluoroheptane sulfonate, perfluoroheptane sulfonic acid (PFHpS), perfluorononanoate, perfluorononanoic acid (PFNA), perfluorononane sulfonate, perfluorononane sulfonic acid (PFNS), perfluorooctanoate, perfluorophosphonic acid (PFPA), perfluoropentanoate, perfluoropentanoic acid (PFPeA), perfluoropentane sulfonate, perfluoropentane sulfonic acid (PFPeS), perfluorophosphinic acid (PFPiA), Perfluorotetradecanoic acid (PFTeDA), Perfluorotridecanoic acid (PFTrDA), perfluoroundecanoate, perfluoroundecanoic acid (PFUnA), perfluoroundecane sulfonate (PFUnS), perfluoroundecane sulfonic acid (PFUnSA), or polytetrafluoroethylene (PTFE).

Sorbent Materials

The disclosure provides a variety of sorbent materials including, but not limited to, carbonaceous char, activated carbon, reactivated carbon, carbon black, natural and synthetic zeolite, silica, silica gel, alumina, alumina clay, zirconia, diatomaceous earths, or metal oxides. The sorbent materials may be used alone or in combination. In some embodiments where sorbent materials are used in combination, multiple treated sorbents are mixed together; such treated sorbents can be the same or different. In other embodiments, a sorbent material that is treated as described herein is combined with a sorbent material that is not treated. For example, in an embodiment, a first sorbent material that is treated according to the disclosure and is one or more of carbonaceous char, activated carbon, reactivated carbon, or carbon black and is mixed with a second sorbent that is not treated according to the disclosure and is one or more of carbonaceous char, activated carbon, reactivated carbon, carbon black, natural and synthetic zeolite, silica, silica gel, alumina, alumina clay, zirconia, diatomaceous earths, or metal oxides.

In some embodiments, the sorbent material is activated carbon or reactivated carbon. In such embodiments, the activated or reactivated carbon is prepared from any precursor carbonaceous material known in the art including, but not limited to bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, polymer fibers, and any other carbonaceous material or combinations thereof. In some embodiments, the carbonaceous material may be derived from activated carbons produced from various precursors that have been in-use and subsequently reactivated and/or regenerated. In some embodiments, the sorbent material feedstock is provided in a preoxidized state. In other embodiments, the sorbent material feedstock is provided in an unoxidized state.

When the sorbent material is an activated carbon or a reactivated carbon, it is of various grades and types selected based on performance requirements, cost, and other considerations. In some embodiments, the sorbent material is activated carbon or reactivated carbon that is in powdered form. In other embodiments, the sorbent material is activated carbon or reactivated carbon that is granular form, where such granular activated carbon or reactivated carbon is formed by pulverizing a precursor carbonaceous material, forming the resultant pulverized material into briquettes, and subsequently pulverizing the briquettes into the desired size. The resultant granular material is then heated to perform various operations including removal of volatile compounds and activating the precursor carbonaceous material that is included therein. In still further embodiments, the sorbent material is activated carbon or reactivated carbon that is in pelletized form. In such embodiments, the sorbent material is formed by pulverizing a precursor carbonaceous material, extruding the pulverized material along with binder material into pellets. The pellets are then heated to perform various operations including removal of volatile compounds and activating the precursor carbonaceous material that is included therein.

The sorbent material made from activated carbon and/or reactivated carbon is formed by any useful process. In some embodiments, the activated carbon and/or reactivated carbon is formed by carbonization, activation, and/or reactivation. In some embodiments, the activated carbon and/or reactivated carbon is formed by oxidizing and devolatizing the carbonaceous material, with steam and/or carbon dioxide gasified to form the pore structure in the activated carbon or reactivated carbon that gives the activated carbon or reactivated carbon sorbent material properties. The initial oxidation and devolatilization process may include a chemical treatment with a dehydrating chemical, such as phosphoric acid, sulfuric acid, sodium hydroxide, potassium hydroxide, and combinations of those.

In some embodiments, the activated carbon is granular activated carbon (GAC), which is defined as activated carbon particles sized to be retained on a 50-mesh sieve (holes of about 0.300 mm). In other embodiments, the activated carbon is powdered activated carbon (PAC), which is defined as particles that pass through an 80-mesh sieve (holes of about 0.180 mm). While these particle size ranges are mentioned for activated carbon sorbent materials, it is also contemplated that any of the discloses sorbent materials may be measured by the above 50-mesh and 80-mesh sieve sizes.

In some embodiments, the sorbent material is a reactivated sorbent material that has previously had its sorbent capacity exhausted and that has been reactivated to restore at least some of the original sorbent capacity. Any of the above listed sorbent materials can be reactivated following service, and the reactivation can be performed by heat, pressure, chemical exposure, or combinations of the above. In some embodiments, the reactivated sorbent material is reactivated carbon. Reactivated carbon is manufactured by heating spent, exhausted activated carbon in furnaces that are devoid of oxygen and using steam as a selective oxidant. During reactivation, absorbed and adsorbed organic compounds are either volatilized from the activated carbon or pyrolized to form carbon char. In some embodiments, heating takes place above about 700° C., and the resulting reactivated carbon may thereafter be reused for various purposes including water treatment. In some embodiments, the temperature of heating is about 500° C., about 550° C., about 600° C., about 650° C., about 700° C., about 750° C., about 800° C., about 850° C., about 900° C., about 950° C., about 1000° C., about 1050°, about 1100° C., or any range that is made of any two or more points in the above list.

In some embodiments, the sorbent material is deployed in applications that expose it to waters that include mineral content. In some embodiments, the mineral content includes calcium carbonate which accumulates on the sorbent material during its use in filtering water. In such embodiments, reactivation of the spent sorbent material results in the following reaction: $CaCO_3$ (s)→$CaO$ (s)+$CO_2$ (g). As will be seen in the Examples, this regeneration technique results in reactivated sorbent material having improved sorbent performance for PFAS compounds, which includes PFOA and PFOS compounds. It is contemplated that the same performance improvements apply not only to PFAS compounds, but also to other chemically similar or chemically related compounds.

In some embodiments, the sorbent material is treated with an ion, salt, oxide, hydroxide, or carbonate of International Union of Pure and Applied Chemistry (IUPAC) Group 2, the alkaline earth metals. Of those compounds, Mg, Ca, Sr, Ba, and combinations thereof are contemplated as useful. Exemplary oxides include MgO, CaO, SrO, BaO, and combinations thereof. The combination may be by mixture of the above listed ions, salts, oxides, hydroxides, or carbonates, or by chemical combination of the above listed ions, oxide, hydroxides, or carbonates, in any stoichiometry. Each of the above mentioned compounds may be used alone or in combination, and they may further be used in any possible stoichiometry. Combinations of one or more ions, oxides, hydroxides, and carbonates of IUPAC Group 2 are also contemplated. The combination may be by mixture, or by stoichiometry or doping the metals in the oxides that the activated carbon is treated with. The treatment of the sorbent material with one or more treatment materials may be by any suitable method, including dry mixing, wet impregnation, chemical vapor deposition, physical vapor deposition, or combinations of the above. Furthermore, the same or different treatments may be used to deposit more than one material on the sorbent material. The treatment may also be achieved as a byproduct of sorbent material use without a separate treatment step. For example, in some embodiments, sorbent materials that are used in active service and which become laden with minerals that are naturally present in water including ions, oxides and carbonates of calcium, magnesium, sodium, potassium, magnesium, and zinc. Examples of such minerals include but are not limited to calcium ions, calcium oxides and hydroxides, calcium carbonate ($CaCO_3$), magnesium ions, magnesium oxides and hydroxides, magnesium carbonate ($MgCO_3$), sodium ions, sodium oxides and hydroxides, sodium carbonate ($Na_2CO_3$), potassium ions, potassium oxides and hydroxides, potassium carbonate ($K_2CO_3$), zinc ions, zinc oxides and hydroxides, zinc carbonate ($ZnCO_3$), and combinations of the above. The treatment is contemplated to improve the sorbent performance of the sorbent materials. It is contemplated that the same performance improvements apply to PFAS compounds including PFOA and PFOS, as well as other chemically similar or chemically related compounds.

The amount of the above ion, oxide, hydroxide, carbonate, or combination of those materials is measured by weight with respect to the total weight of the treated sorbent material and the ion, oxide, hydroxide, carbonate, or combination of those materials. The amount of the ion, salt, oxide, hydroxide, or carbonate is not limited and in some embodiments is less than about 25% wt. %, less than about 20 wt. %, less than about 15 wt. %, less than about 10 wt. %, less than about 8 wt. %, less than about 6 wt. %, less than about 4 wt. %, less than about 2 wt. %, less than about 1 wt. %, less than about 0.9 wt. %, less than about 0.8 wt. %, less than about 0.7 wt. %, less than about 0.6 wt. %, less than about 0.5 wt. %, less than about 0.4 wt. %, less than about 0.3 wt. %, less than about 0.2 wt. %, or less than about 0.1 wt. %. In some embodiments the amount of the ion, salt, oxide, hydroxide, or carbonate is about 25% wt. %, about 20 wt. %, about 15 wt. %, about 10 wt. %, about 9 wt. %, about 8 wt. %, about 7 wt. %, about 6 wt. %, about 5 wt. %, about 4 wt. %, about 3 wt. %, about 2 wt. %, about 1 wt. %, about 0.9 wt. %, about 0.8 wt. %, about 0.7 wt. %, about 0.6 wt. %, about 0.5 wt. %, about 0.4 wt. %, about 0.3 wt. %, about 0.2 wt. %, about 0.1 wt. %, or any range formed of any of the above two endpoints. In some embodiments, the amount of the ion, salt, oxide, hydroxide, or carbonate is about 1 wt. % to about 10 wt. %, about 2 wt. % to about 10 wt. %, about 4 wt. % to about 10 wt. %, about 6 wt. % to about 10 wt. %, about 1 wt. % to about 8 wt. %, about 2 wt. % to about 8 wt. %, about 4 wt. % to about 8 wt. %, about 4 wt. % to about 6 wt. %, or about 6 wt. % to about 8 wt. %.

The sorbent material can be formed by various techniques. In one embodiment, the sorbent material includes activated carbon that is a reagglomerated activated carbon. In reagglomerated activated carbon, the precursor carbonaceous material which is usually coal is pulverized to a powder. The powder is next mixed with a binder. The mixture of powder and binder is then reagglomerated into briquettes. The briquettes are then crushed and sized. The now crushed and sized briquettes are carbonized to harden the binder, and finally the crushed, sized, and carbonized briquette materials are thermally activated. This process forms a granulated activated carbon. During this process, the one or more ions, salts, oxides, hydroxides, or carbonates of IUPAC Group 2 elements, including Mg, Ca, Sr, Ba, and combinations can be added. In one embodiment, powders of the ions, salts, oxides, hydroxides, or carbonates are mixed with the pulverized coal before mixing with a binder. In another embodiment, a liquid solution of the ions, salts, oxides, hydroxides, or carbonates is applied to the crushed and sized briquettes before the carbonization step. In another embodiment, a liquid solution of the ions, salts, oxides, hydroxides, or carbonates is mixed after the carbonization step but before the activation step.

In some embodiments, the sorbent material is formed from a precursor that is a spent activated carbon that was previously used for water filtration and which is reactivated. In particular, spent activated carbon that has been used in point of use filters, point of entry filters, portable filters, and municipal drinking water filtration frequently contain significant amounts of inorganic minerals that reside on the surface of the activated carbon materials. In other embodiments, the precursor carbonaceous material is a spent activated carbon that was not previously used for water filtration, but was used for other applications. The other applications include food processing, beverage processing, sugar refining, wastewater treatment, waste gas treatment, tank cleaning, tank degassing, and combinations of the above. In some embodiments, the spent activated carbon that was previously used for water filtration contains one or more inorganic materials that are present in ground water including ions, oxides and carbonates of calcium, magnesium, sodium, potassium, and zinc.

In some embodiments, the sorbent material formed from a precursor that is a spent activated carbon is not treated to remove any of the inorganic materials that are present in ground water. This means that the sorbent material will include ions, oxides, and carbonates of calcium, magnesium, sodium, potassium, and zinc. In still further embodiments, the sorbent material formed from a precursor that is a spent activated carbon is not treated by acid washing to remove any of the inorganic materials that are present in ground water. In such embodiments, the one or more ions, salts, oxides, hydroxides, or carbonates that are present in ground water have been slowly impregnated onto the surface of the spent activated carbon, and are retained during reactivation to thereby form a sorbent material.

Uses

The sorbent materials of the disclosure are useful whenever it is necessary to remove PFAS, PFOA, PFOS or chemically similar or chemically related compounds from liquids and/or gases, including water. The removal may be for the purposes of human or animal consumption, or for environmental remediation. Specific applications include point of use filters, point of entry filters, portable filters, municipal drinking water filtration, municipal waste filtration, and industrial waste filtration. In some embodiments, the sorbent materials of the disclosure are used alone, without any other sorbent materials. In some embodiments, the sorbent materials of the disclosure are used in combination with other sorbent materials.

Although the sorbent materials of the disclosure are primarily disclosed as removing PFAS, PFOA, PFOS, or chemically similar or chemically related compounds, the use of the sorbent materials is not so limited. In still further embodiments, the sorbent materials are suitable for removing any compounds and/or byproducts that cause taste and odor problems in water. Such compounds are referred to as "taste and odor compounds" throughout the application. Examples of such taste and odor compounds include one or more of trans-1,10-dimethyl-trans-9-decalol ("Geosmin"), 2-methylisoborneol (MIB), isopropylmethoxypyrazine (IPMP), isobutylmethoxypyrazine (IBMP), methyl tertiary butyl ether (MTBE), 2,4-heptadienal, decandienal, octanal, chlorine, chloramine, chlorophenols, iodoform, hydrocarbons, volatile organic compounds (VOCs), iron, iron oxides, copper, copper oxides, zinc, zinc oxides, manganese, and manganese oxides.

In some embodiments, the sorbent materials are provided within a container. The container holds the sorbent materials and allows the liquid or gas to flow on or through the container, thus bringing the liquid or gas in contact with the sorbent materials. In some embodiments, the container is a permanent container that is installed within a device or process facility and which is connected by piping or other fluid conduits so that the liquid or gas flows through the container. From time to time, the spent sorbent materials are emptied from the container and replaced by virgin sorbent materials or reactivated sorbent materials, or both, in order to ensure that the sorbent materials remain effective in removing PFAS, PFOA, PFOS, or chemically similar or chemically related compounds from liquid or gas that flows through the container. The physical form of the sorbent materials within the container is not limited, and the sorbent materials can be provided loose (alone) or formed as a cartridge with other structural materials that hold it in place or which are mixed as a binder.

In some embodiments, the container itself is designed to be replaced rapidly and with minimal change to outside components such as pumps and conduits that convey the liquids or gases to the container. In such embodiments, the container is referred to as a "cartridge," and it can be connected and disconnected from surrounding components. In some embodiments, the cartridge is disposable, such as in consumer drinking water applications. In other embodiments, the cartridge is intended to be refurbished, with the cartridge containing spent sorbent returned for cleaning or reactivation of the sorbent material, refilled with fresh virgin or reactivated sorbent material, and returned to service following completion of the refurbishing operation.

The above sorbent materials may be used alone or in combination with other materials. In some embodiments, a composition is formed where a sorbent material is combined with a binder and molded, extruded, or otherwise formed into shapes or pellets. The binder is not limited and includes inorganic binder and organic binder. As examples of inorganic binder, metals, ceramics, clays, glasses, or combinations of one or more of the above are commonly used. As examples of organic binders, petroleum resins and/or pitches, natural resins and/or pitches, polymers, or combinations of one or more of the above are used.

EXAMPLES

While several experimental Examples are contemplated, these Examples are intended to be non-limiting.

Example 1

A column of granulated activated carbon (GAC) was constructed to test for the adsorption of PFAS compounds. First, an exhausted stock of FILTRASORB 400 (F400) that was previously used to filter municipal drinking water is provided. Such materials are available from Calgon Carbon Corp. of Moon Township, PA. FILTRASORB F400 is a coal-based granular activated carbon having 2 wt. % maximum moisture, effective size of about 0.55 mm to about 0.75 mm, and an apparent density of about 0.54 g/cm$^3$. The exhausted F400 is reactivated under elevated temperatures with steam in a rotating kiln to restore its surface activity and break down any organic compounds.

The now-reactivated F400 is designated as F400 CMR (Custom Municipal React). The reactivated F400 CMR is similar to virgin F400 material, but because the reactivated F400 CMR was previously used to treat groundwater with elevated calcium levels, the reactivated F400 CMR has a higher calcium content than virgin F400 activated carbon. In Example 1, the F400 CMR had a calcium content of about 0.36 wt. % versus 0.05 wt. % for virgin F400.

Referring now to FIG. 1, the results of a PFAS rapid small scale column test (RSSCT) using a PFOA breakthrough curve is shown. The testing was conducted according to ASTM D6586-03(2014) but scaled down to a column diameter of 0.62 cm. The inlet concentrations were about 0.9 µg/L PFOA and about 1.7 µg/L total PFAS and data was logged to yield a breakthrough curve. Breakthrough was measured as the concentration in µg/L that broke through a column of virgin F400 or F400 CMR. Also shown in FIG. 1 is the EPA Health Advisory Limit of 70 parts per trillion, which is equivalent to 0.07 µg/L breakthrough concentration. The amounts plotted are amounts of PFOA in the water.

As shown in FIG. 1, the virgin F400 carbon began to show elevated concentrations at about 10,000 bed volumes of water passing through the carbon in the bed, indicating that there was initial breakthrough of PFOA. In contrast, FIG. 1 shows that the F400 CMR resisted breakthrough of PFOA until at least about 20,000 bed volumes of water passing through the carbon in the bed. The greater breakthrough bed volume equivalents of water indicate that a filter that is constructed using a bed of F400 CMR activated carbon can absorb and adsorb greater amounts of harmful PFAS compounds than the same filter constructed with virgin F400 activated carbon.

Example 2

Using the same procedures as above in Example 1, a column of GAC was constructed and tested using the same virgin F400 activated carbon and the F400 CMR reactivated carbon that has elevated levels of calcium as in Example 1. The resulting columns were tested with an inlet concentration of about 230 ng/L PFOA concentration in water, which is about 230 nanograms per liter of PFOA. The total concentration of perfluorinated chemicals (PFC) in the inlet water was about 1.2 µg/L, which includes the above concentration of PFOA.

Figure 2:
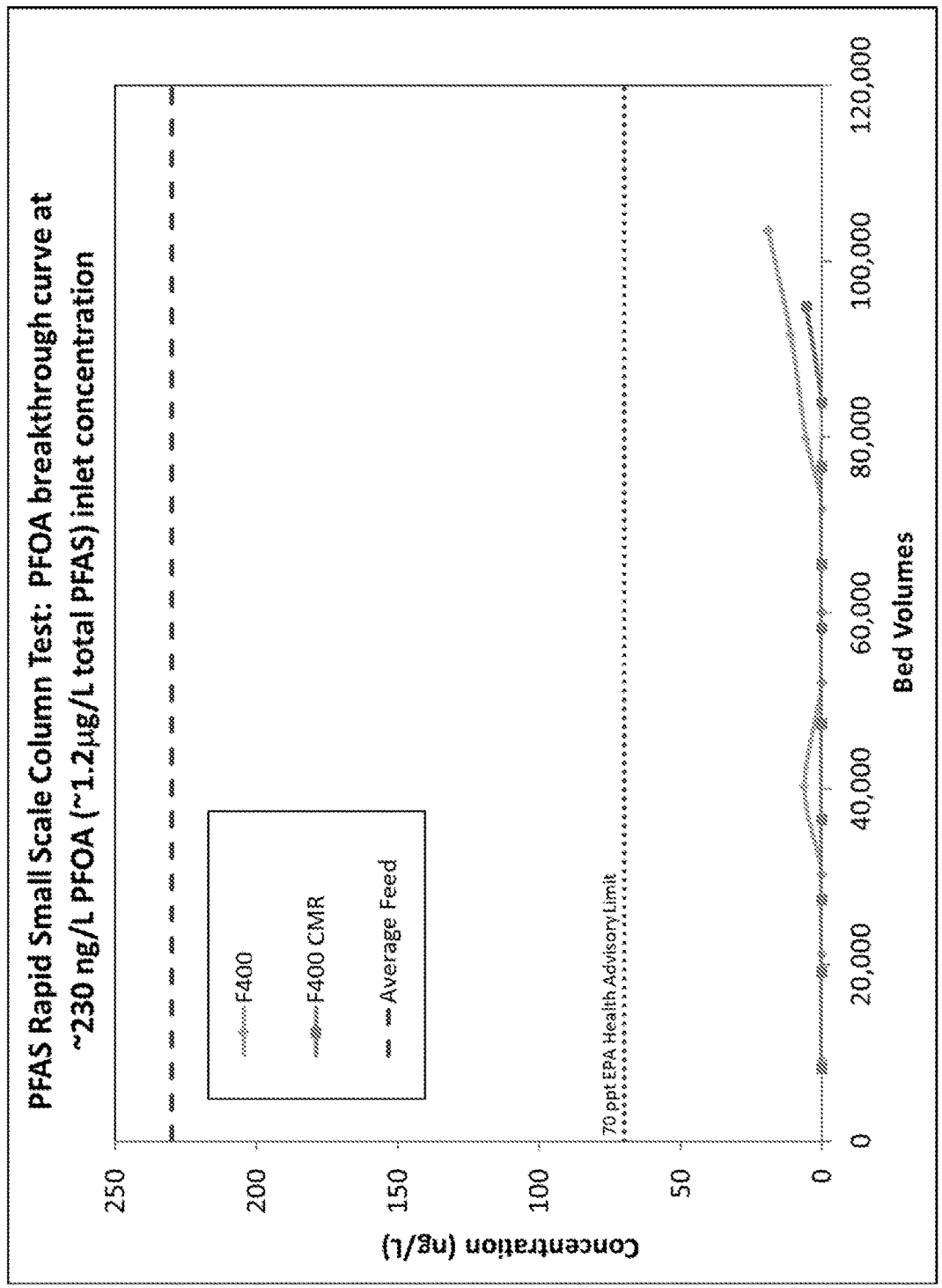
FIG. 2 is a graphical representation of further results of rapid small scale column testing of activated carbon and reactivated carbon having elevated calcium content.
Figure 3:
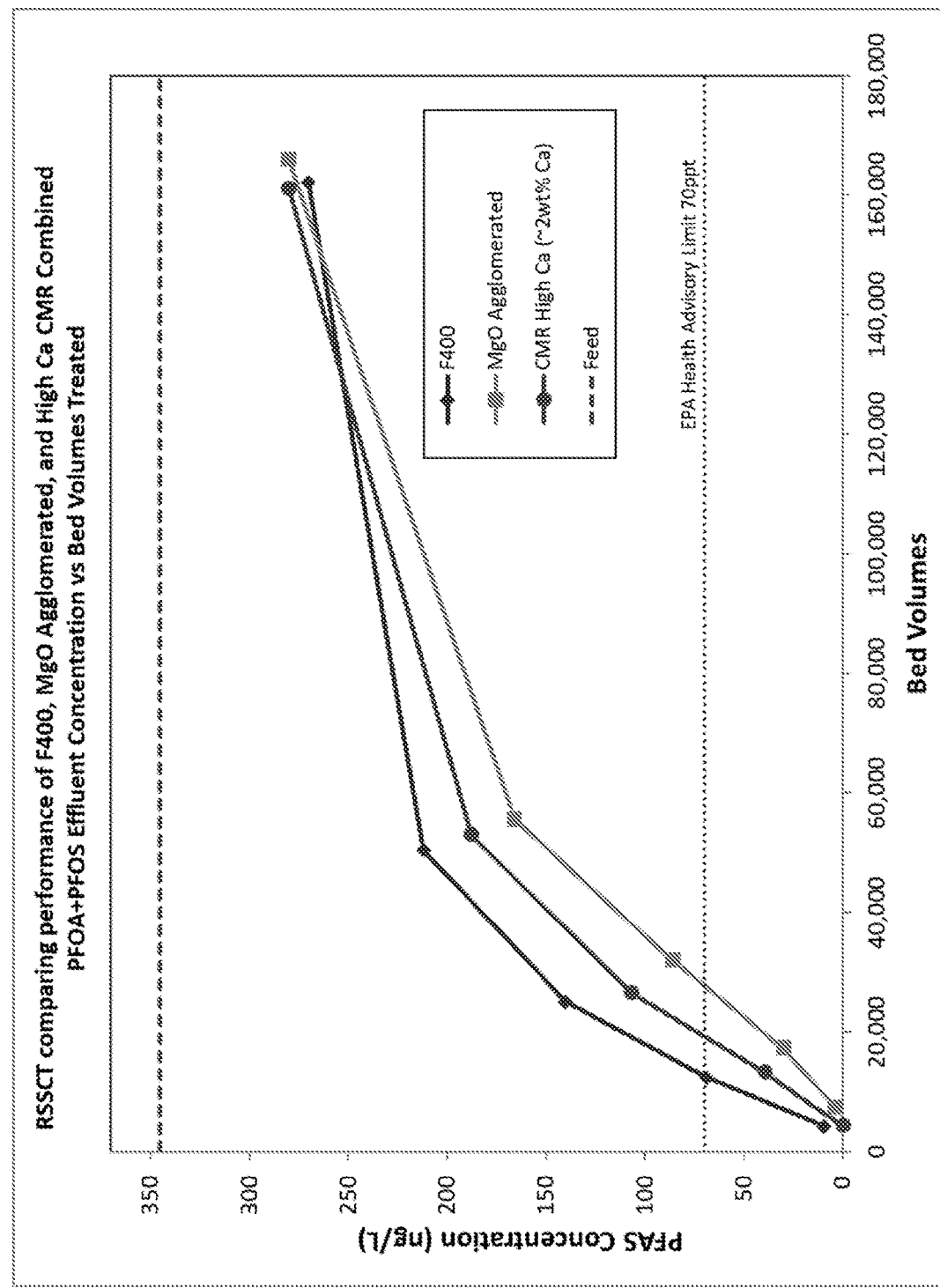
FIG. 3 is a graphical representation comparing the results of testing activated carbon, reactivated carbon having elevated calcium content, and activated carbon having elevated magnesium content.

The results of Example 2 are shown in FIG. 2. In FIG. 2, the endurance of the GAC column is again shown by the breakthrough in bed volume equivalents. The virgin F400 began to show signs of breakthrough at about 70,000 bed volumes, while the reactivated F400 CMR only showed signs of breakthrough at about 95,000 bed volumes.

Example 3

A MgO agglomerated carbon was prepared. The MgO agglomerated carbon is manufactured from reagglomerated metallurgical grade bituminous coal. During the reagglomeration process, the pulverized coal was impregnated with magnesium oxides which were added in a dry state.

An additional CMR reactivated carbon was also prepared and is referred to as "CMR High Ca." The CMR High Ca reactivated carbon is similar to virgin F400 carbon and previously described CMR reactivated carbon, except CMR High Ca has an increased calcium content. The CMR High Ca reactivated carbon as tested had a calcium content of about 2 wt. % versus about 0.36 wt. % for CMR and 0.05 wt. % for virgin F400 carbon.

The above described F400, MgO Agglomerated, and F400 High Ca were tested to determine the simulated days of operation. In these tests, the inlet concentration of PFOA+ PFOS was 345 ng/L, the inlet concentration of PFOA was 185 ng/L, and the inlet concentration of PFOS was 160 ng/L. The bed volumes were tested until they exhibited a breakthrough concentration of 70 ppt of PFOA, PFOS, or both PFOA and PFOS (shown as PFOA+PFOS). The results of these tests are described in Table 1 below:

TABLE 1

| Sample | PFOA + PFOS | | PFOA | | PFOS | |
|---|---|---|---|---|---|---|
| | Days | Bed Volumes | Days | Bed Volumes | Days | Bed Volumes |
| F400 | 90 | 12851 | 140 | 19990 | 251 | 35839 |
| MgO Agglomerated | 174 | 25282 | 230 | 33419 | 549 | 79770 |
| CMR High Ca (about 2 wt. % Ca) | 133 | 19066 | 172 | 24657 | 402 | 57628 |

The specification characteristics of the same three activated carbons in Table 1 was also tested. This testing includes results for the apparent density of the carbon when measured using ASTM 2854-09(2014). The results of this testing are provided below in Table 2:

TABLE 2

| | Apparent Density (g/cm³) | Days to 70 parts per trillion (ppt) PFOA + PFOS |
|---|---|---|
| F400 | 0.54 | 90 |
| MgO Agglomerated | 0.51 | 174 |
| CMR High Ca (about 2 wt. % Ca) | 0.59 | 133 |

The results of the testing demonstrate that the treatment of activated carbon with various components has a significant effect on the performance of the activated carbon that is used as the sorbent for PFOA, PFOS, and/or combinations of these two classes of compounds found in drinking water applications.

Example 4

Figure 4:
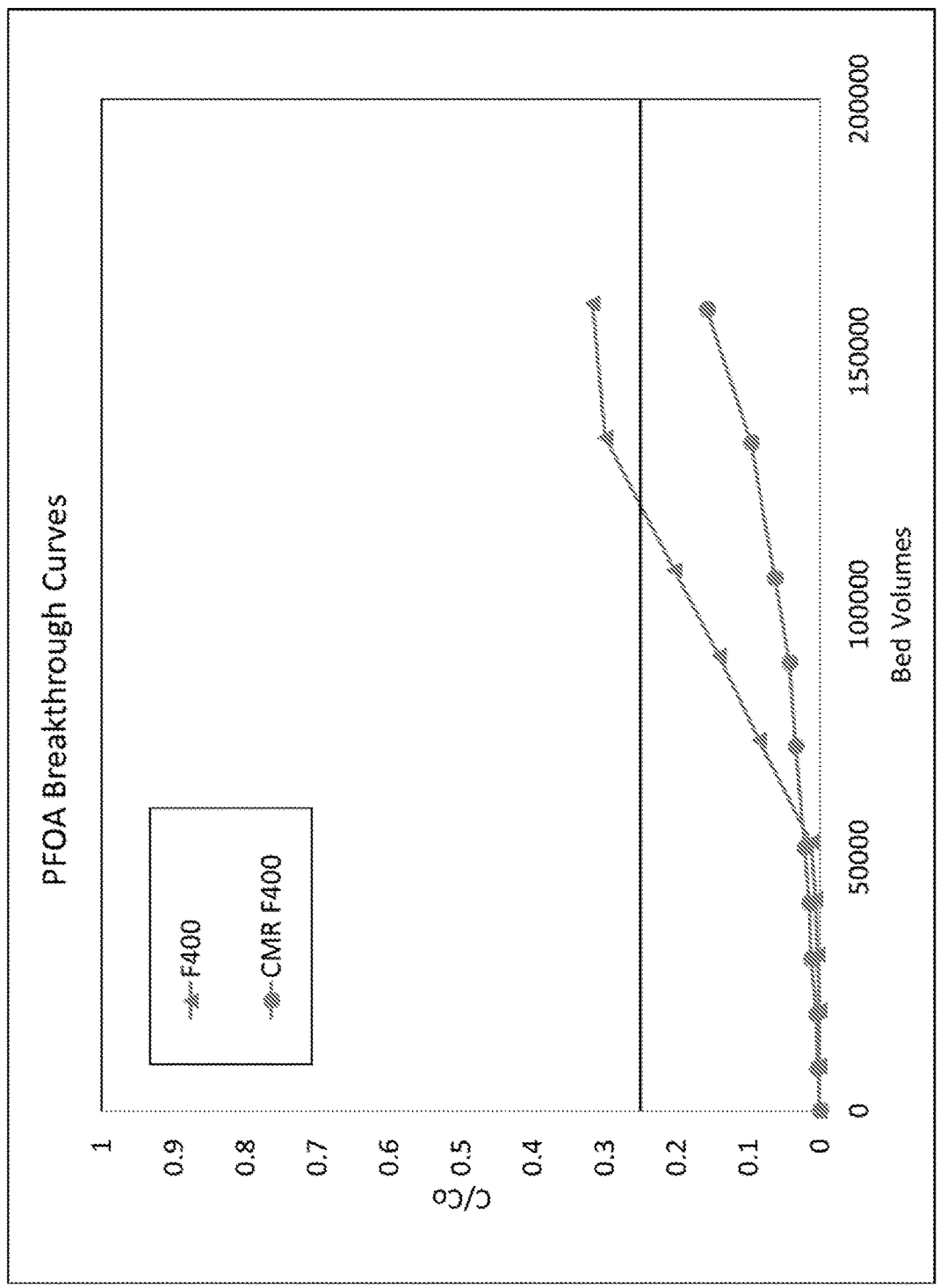
FIG. 4 is a graphical representation of the results of testing activated carbons and reactivated carbons having elevated calcium content.
Figure 5:
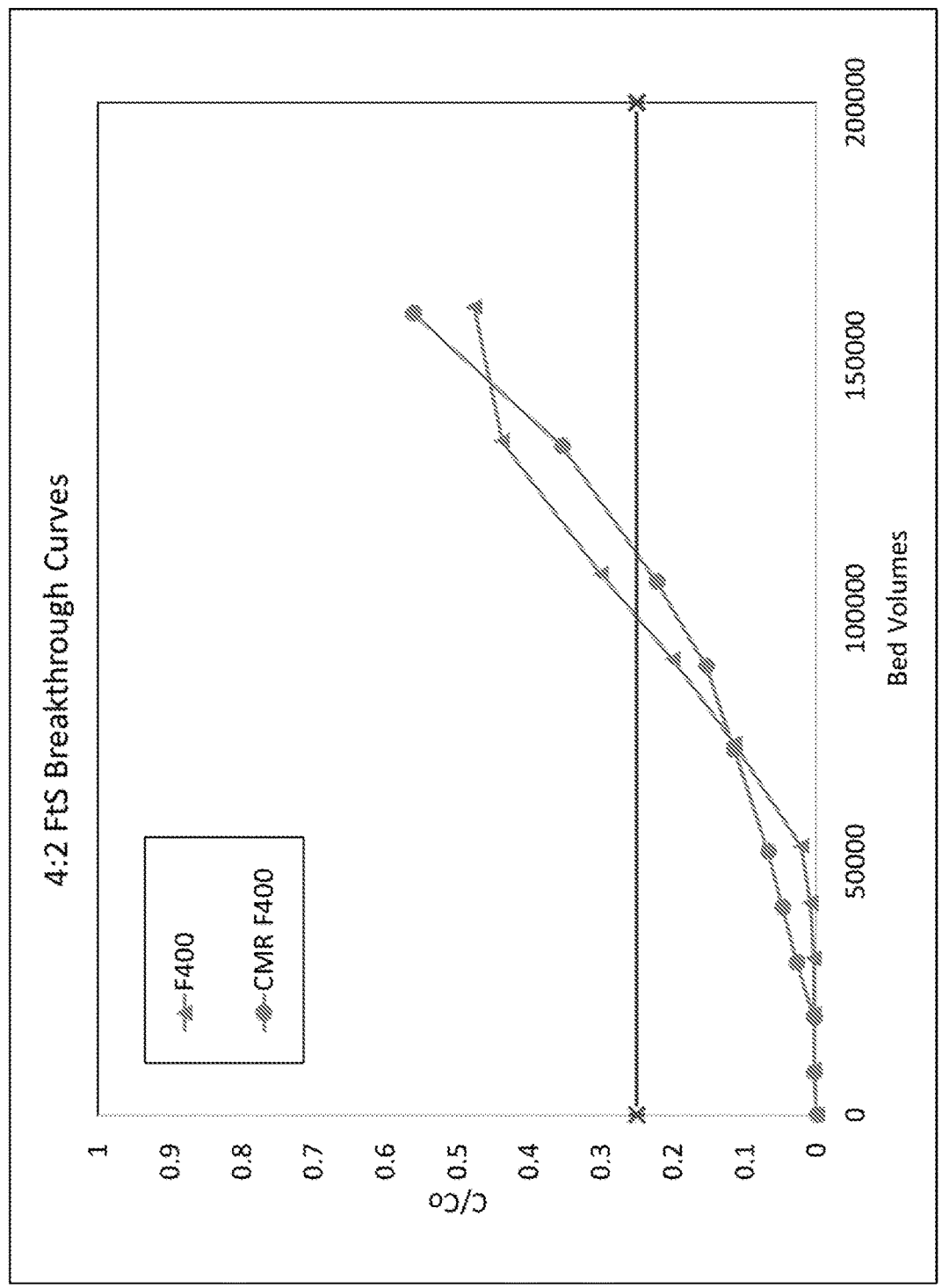
FIG. 5 is a graphical representation of further results of testing activated carbons and reactivated carbons having elevated calcium content.
Figure 6:
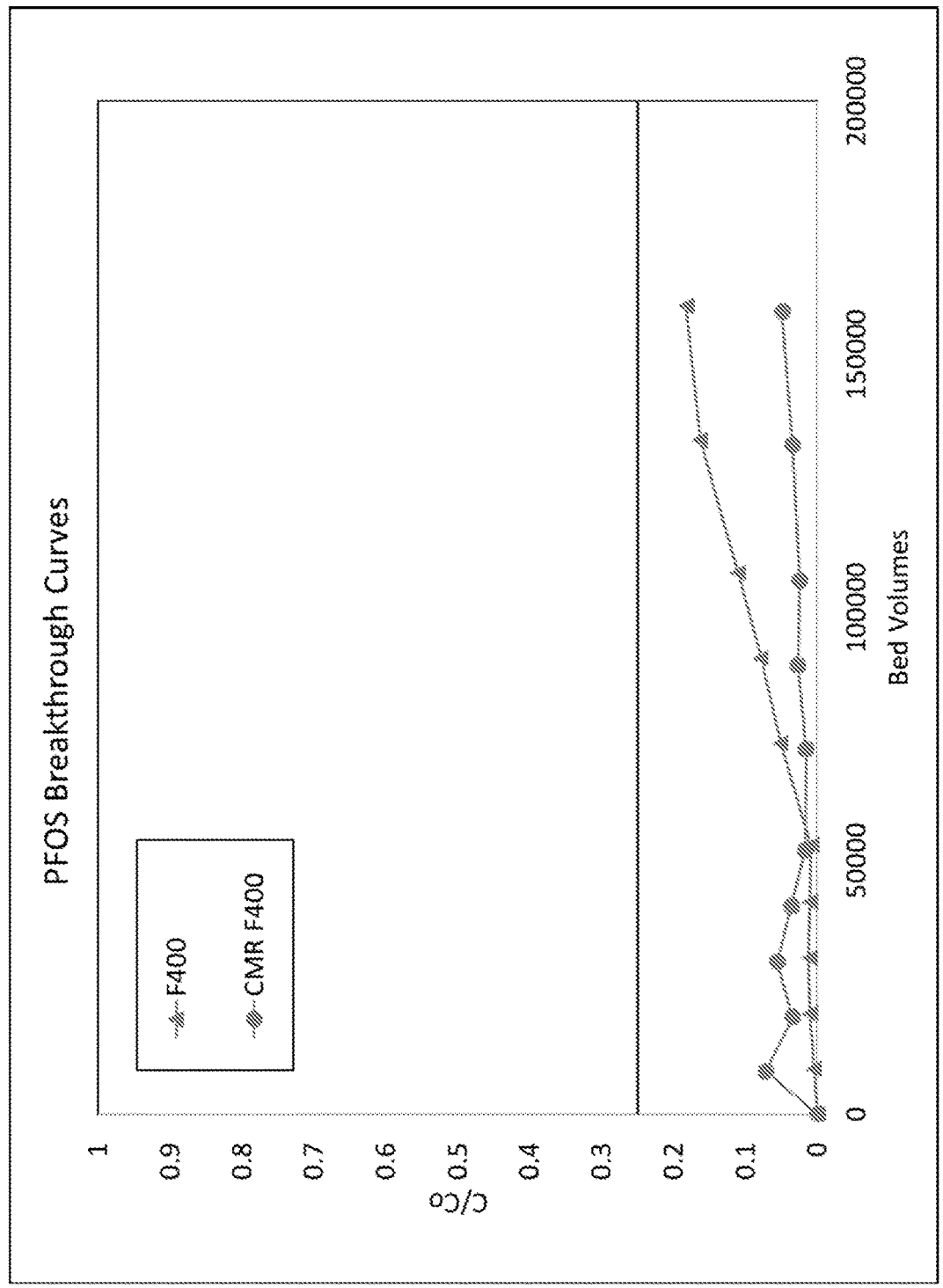
FIG. 6 is a graphical representation of further results of testing activated carbons and reactivated carbons having elevated calcium content.

Using the same procedures as above in Example 1, a column of GAC was constructed and tested using the same F400 and CMR F400 discussed above. The results of Example 4 are shown in FIGS. 4-6. FIG. 4 shows the results for the adsorption of different PFOA compounds. The endurance of the GAC columns is shown by the PFOA effluent concentration breakthrough in bed volume equivalents. The columns were tested with an inlet concentration of about 153 ng/L PFOA concentration in water, which is about 153 nanograms per liter of PFOA.

FIG. 5 shows the results for the adsorption of 4:2 FtS (6:2-fluorotelomersulfonic acid) compounds. The endurance of the GAC columns is shown by the 4:2 FtS effluent concentration breakthrough in bed volume equivalents. The columns were tested with an inlet concentration of about 130 ng/L 4:2 FtS concentration in water, which is about 130 nanograms per liter of 4:2 FtS.

FIG. 6 shows the results for the adsorption of PFOS compounds. The endurance of the GAC columns is shown by the PFOS effluent concentration breakthrough in bed volume equivalents. The columns were tested with an inlet concentration of about 177 ng/L PFOS concentration in water, which is about 177 nanograms per liter of PFOS.

Example 5

A CMR reactivated carbon was prepared and is referred to as "Acid Washed CMR 0.65% Ca." The Acid Washed CMR 0.65% Ca reactivated carbon is the same as the CMR High Ca described above, except it is acid washed and has decreased Ca content. The CMR High Ca, also referred to as "CMR 2 wt. % Ca," as tested had a Ca content of about 2 wt. %. The Acid Washed CMR 0.65% Ca as tested had a Ca content of about 0.65 wt. %.

Two other samples of GAC were prepared and are referred to as "AdMix MgO 4.8% as Mg" and "AdMix MgO 12% as Mg." These samples were obtained by adding pulverized MgO to activated CAL 12X40 GAC (Calgon Carbon Corporation), activated carbon from coal-based reagglomerated bituminous virgin carbon. Specifically, AdMix MgO 4.8% as Mg was prepared by adding 8% of pulverized MgO to CAL 12X40 and AdMix MgO 12% as Mg was prepared by adding 20% of pulverized MgO to CAL 12X40. The resulting AdMix MgO 4.8% as Mg and AdMix MgO 12% as Mg samples as tested had a divalent cation content of about 4.8% and about 12% respectively.

The MgO Agglomerated sorbent discussed above was tested and had a divalent cation content of about 4%. The MgO Agglomerated is different than the AdMix MgO 4.8% as Mg and AdMix MgO 12% as Mg because the MgO in the MgO Agglomerated is added prior to the carbonizing and activating of the carbon.

Using the same procedures as above in Example 1, a column of GAC was constructed and tested using CAL—Virgin Carbon (CAL 12X40), Acid Washed CMR 0.65% Ca, CMR High Ca (about 2 wt. % Ca), Agglomerated MgO, AdMix MgO 4.8% as Mg, and AdMix MgO 12% as Mg.

The specification characteristics of the GAC were also tested. This testing includes results for the percent of divalent cation measured using Proton Induced X-ray Emission (PIXE). This testing also includes results for the apparent density of the carbon when measured using ASTM 2854-09(2014). The results of this testing are provided below in Table 3:

TABLE 3

| Sample | Divalent Cation (%) | Apparent Density (g/cm³) | Bed Volume Equivalent at 25% Breakthrough |
|---|---|---|---|
| CAL-Virgin Carbon | 0.05 | 0.49 | 21740 |
| Acid Washed CMR 0.65% Ca | 0.65 | 0.55 | 15757 |
| CMR 2 wt. % Ca | 2.0 | 0.59 | 18162 |
| Agglomerated MgO | 4.0 | 0.51 | 27930 |
| AdMix MgO 4.8% as Mg | 4.8 | 0.49 | 22837 |
| AdMix MgO 12% as Mg | 12.0 | 0.49 | 18614 |

Figure 7:
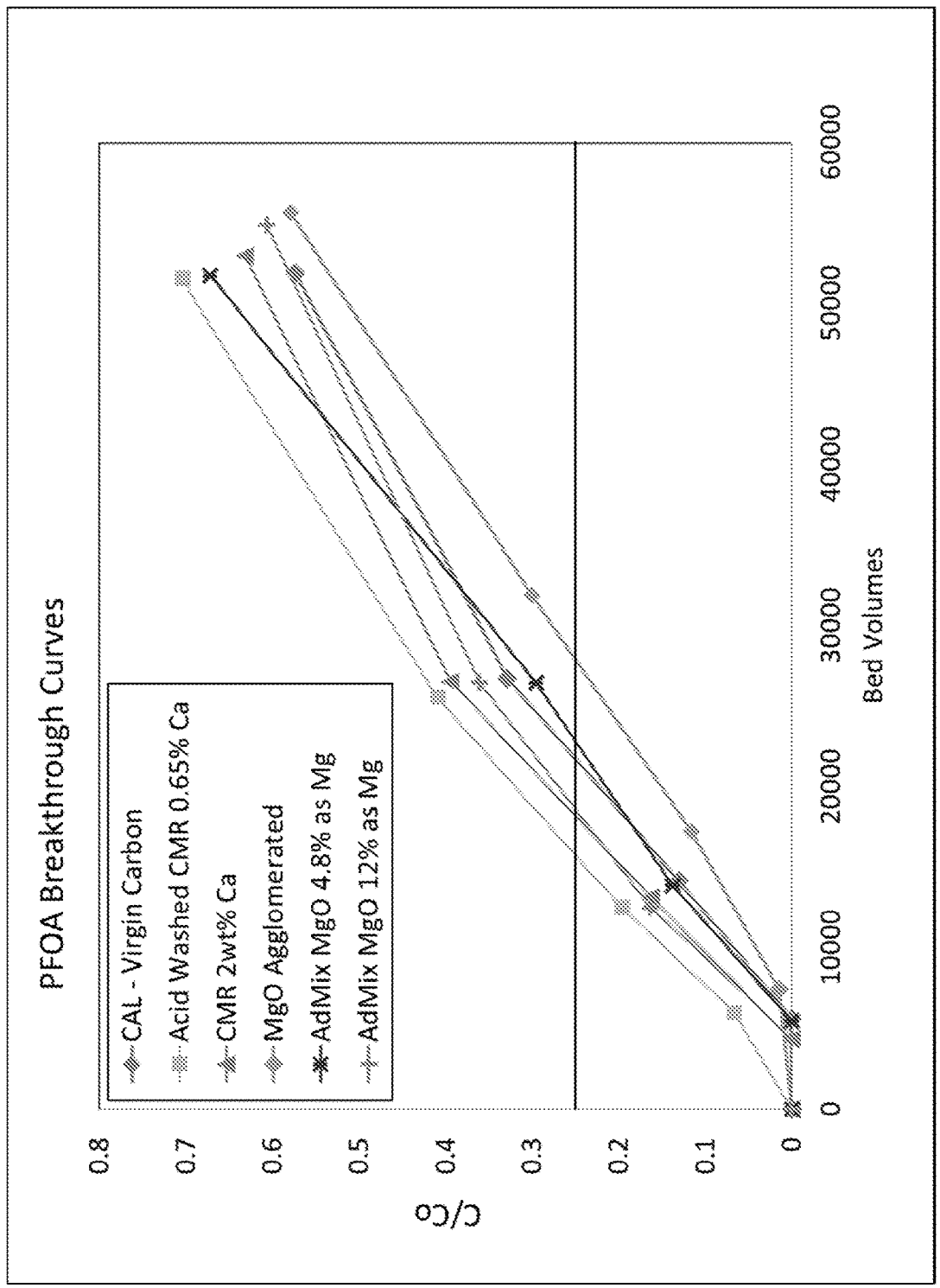
FIG. 7 is a graphical representation of the results of testing virgin coal-based activate carbons, acid washed reactivated carbon having elevated calcium content, reactivated carbon having high calcium content, activated carbon with high magnesium content, and activated carbon with pulverize magnesium oxide content.

The results of Example 5 are shown in FIG. 7. FIG. 7 shows the results for the adsorption of PFOA compounds. The endurance of the GAC columns is shown by the PFOA effluent concentration breakthrough in bed volume equivalents. The columns were tested with an inlet concentration of about 61 ng/L PFOA concentration in water, which is about 61 nanograms per liter of PFOA. The Acid Washed CMR 0.65% Ca began to show signs of breakthrough first followed by the CAL—Virgin Carbon, CMR 2 wt. % Ca, Agglomerated MgO, AdMix MgO 4.8% as Mg, and AdMix MgO 12% as Mg.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also understood that this disclosure is not limited to particular compositions, methods, apparatus, and articles, as these may vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method of removing perfluoroalkyl and polyfluoroalkyl substances (PFAS) from liquid or gas, the method comprising:
   providing a sorbent material comprising reactivated carbon, wherein the reactivated carbon is formed from a spent activated carbon, wherein the spent activated carbon was previously used for water filtration; and
   contacting the sorbent material with a liquid or gas containing the PFAS wherein the reactivated carbon was reactivated by heat at a temperature of about 500° C. to about 1100° C..

2. The method of claim 1, wherein the reactivated carbon was reactivated by heat at a temperature of about 700° C.

3. The method of claim 1, wherein the reactivated carbon is formed from spent sorbent material feedstock comprising calcium carbonate.

4. The method of claim 1, wherein the reactivated carbon comprises one or more of granular activated carbon and powdered activated carbon.

5. The method of claim 1, wherein the spent activated carbon is not treated to remove any inorganic materials that are present in ground water.

* * * * *

UNITED STATES PATENT AND TRADEMARK OFFICE
CERTIFICATE OF CORRECTION

PATENT NO. : 12,478,948 B2
APPLICATION NO. : 18/442503
DATED : November 25, 2025
INVENTOR(S) : Rebecca L. Distefano et al.

Page 1 of 1

It is certified that error appears in the above-identified patent and that said Letters Patent is hereby corrected as shown below:

In the Claims

In Column 14, Line 51, Claim 1, delete "1100° C.." and insert --1100° C.--, therefor.

Signed and Sealed this
Tenth Day of February, 2026

John A. Squires
*Director of the United States Patent and Trademark Office*